United States Patent [19]

Creighton

[11] Patent Number: 4,991,967
[45] Date of Patent: Feb. 12, 1991

[54] SCRATCH DEPTH MEASURING INSTRUMENT AND METHOD

[75] Inventor: Albert K. Creighton, Federal Way, Wash.

[73] Assignee: The Boeing Company, Seattle, Wash.

[21] Appl. No.: 455,920

[22] Filed: Dec. 19, 1989

Related U.S. Application Data

[63] Continuation of Ser. No. 14,136, Jan. 30, 1987, abandoned, which is a continuation of Ser. No. 613,455, May 24, 1984, abandoned.

[51] Int. Cl.$^5$ ............................................. G01B 11/22
[52] U.S. Cl. ..................................... 356/376; 356/378
[58] Field of Search .......................... 356/371, 376, 378

[56] References Cited

U.S. PATENT DOCUMENTS

| | | | |
|---|---|---|---|
| 1,973,066 | 9/1934 | Hauser et al. | 356/376 |
| 2,216,003 | 9/1940 | Eppenstein et al. | 356/376 |
| 2,379,263 | 6/1945 | Vine | 88/14 |
| 3,022,578 | 2/1962 | Seibel | 356/381 |
| 3,269,264 | 8/1966 | Cocks | 356/376 |
| 3,563,665 | 2/1971 | Takahashi et al. | 356/376 |
| 3,619,578 | 11/1971 | George | 235/92 |

FOREIGN PATENT DOCUMENTS 199203  8/1958  Austria ................................. 356/378

OTHER PUBLICATIONS

Spitta, E. J., *Microscopy, The Construction, Theory and Use of the Microscope*, John Murray, London, 1907, pp. 34 & 36.
Naegeli et al., *The Microscope in Theory and Practice*, Swan, Sonnenschein, Lowrey & Co., London, 1887.
Tolanski, S., "A Topographic Microscope," *Scientific American*, Aug. 1954, pp. 54–59.
Saur, R., "Topographic Microscope", *Review of Scientific Instruments*, vol. 29, No. 11 (Nov. 1958), pp. 1023–1026.

*Primary Examiner*—Richard A. Rosenberger
*Attorney, Agent, or Firm*—Joan H. Pauly; Eugene O. Heberer

[57] ABSTRACT

A scratch depth measuring instrument (10) for use on opaque matte or specular surfaces (80) includes a light source (16), a body (40) having a knife edge (38). The light source is positioned to project a shadow pattern of the knife edge and to image it on a scratched surface (80) transversely to a scratch (82) for measuring the scratch depth and to project a visible indentation (132, 132A) from the knife edge (38) into the scratch (82). The indentation can be measured in distance from the knife edge image (92, 92A) to determine the depth of the scratch. The knife edge image (92, 92A) is projected to the surface (80) from a first mirror (62) and a mirror system (98, 100) reflects the image (92, 92A) and the measurable indentation (132, 132A). A microscope (74) has an eyepiece (124) for viewing a reflected image (92, 92A) and indentation (132, 132A) and a reticle (72) in the microscope is read for measuring the indentation (132, 132A) from the knife edge image (92, 92A) to determine the depth of the scratch (82).

15 Claims, 4 Drawing Sheets

SCRATCH DEPTH MEASURING INSTRUMENT AND METHOD

This application is a continuation of application Ser. No. 07/014,136, filed Jan. 30, 1987, which is a continuation of application Ser. No. 06/613,455, filed May 24, 1984, both now abandoned.

TECHNICAL FIELD

The invention relates to a microscopic and projection image-type instrument with which the depth of scratches are measured on opaque matte and specular surfaces.

BACKGROUND ART

During the manufacture of airplanes, finished smooth and polished surfaces become scratched so that they are not acceptable to the purchaser. Such surfaces are aircraft windows, windshields, and polished aluminum clad panels which form the general exterior surface of the aircraft. Scratch depth must be determined to make sure that it is not too deep and that the scratch can be removed without weakening the material beyond acceptable limits.

Prior attempts to determine scratch depths included using mechanical measuring techniques, comparators, and subjective visual examinations. Visual examinations were made by an inspector, who would look at a "standard" scratch and then compare it to a scratch under inspection on an aircraft part. Prior optical instruments used for measuring scratches were designed for use on metallic and other opaque, matte surface finishes. In order to measure a glossy or specular surface, the surface had to be sprayed with a white matte coating. This technique would often fill shallow scratches and would cause considerable errors in the measurement of deeper scratches.

A survey of the market showed no small portable instrument which could measure scratches to 0.0005" on any material with a polished to medium fine surface finish. A search of the patent literature disclosed patents including a series of lenses, a light source, mirrors and a slot or knife edge as an image producing device that is used for comparative readings. For example U.S. Pat. No. 2,216,003 discloses a microscope, FIG. 2, having a prism which has a reflecting hypotenuse covering half of the exit pupil. Laterally of the microscope, there is a diaphragm having an illuminated slit, the diaphragm being disposed opposite the prism so that the ray path from the slit of the diaphragm through the prism to the microscope objective corresponds to the ray path from the objective to a plane containing the mark of the glass plate.

U.S. Pat. No. 2,379,263 discloses apparatus for measuring the flatness of a surface of a glass plate. The apparatus includes a standard plate having a polished surface and means to support a plate to be tested adjacent to and in spaced parallel relationship to the polished surface of the standard plate. Light passes through one plate to strike the surface of the other, the light source being disposed to project a laterally elongated band of light obliquely upon one plate and through the latter upon the other plate. A diffusing screen is adapted to receive images of the bands reflected from the plate to be tested and the standard plate to permit accurate comparison of the images.

U.S. Pat. No. 3,619,578 discloses apparatus for indicating the surface depression of softwood veneer. Light from a microscope illuminator is directed between a straightedge and a surface of the veneer passing in sliding contact underneath the straightedge. A diode detects light reflected above a predetermined intensity from underneath the straightedge as an indication that the depth of the depression is above a minimum. An electronic counter counts the number of such depressions per unit length of veneer.

U.S. Pat. No. 3,396,627 discloses a device for measuring the roughness of a surface. It includes at least one planar target member having one or more targets or groups of spaced lines thereon and being carried by support means, which may rest against the surface to be measured, and is adapted to hold the target member adjacent that surface in a plane at an acute angle relative to the surface, and siding means also carried by the support means and establishing a fixed line of sight of the image of each target or group of lines formed by reflection thereof onto the surface to be measured at an angle of incidence greater than 45°.

The following list of patents disclose optical instruments of general interest:
U.S. Pat. No. 2,446,628, Brown
U.S. Pat. No. 3,314,328, Boettcher
U.S. Pat. No. 3,667,846, Nater et al
U.S. Pat. No. 3,734,626, Roberts et al
U.S. Pat. No. 3,804,521, Sprague
U.S. Pat. No. 3,857,637, Obenreder
U.S. Pat. No. 3,922,093, Dandliker et al
U.S. Pat. No. 4,017,188, Sawatari
U.S. Pat. No. 4,030,830, Holly
U.S. Pat. No. 4,145,140, Fujii
U.S. Pat. No. 4,155,098, Roach et al
U.S. Pat. No. 4,158,507, Himmel
U.S. Pat. No. 4,202,630, Suzuki et al
U.S. Pat. No. 4,363,118, Roach et al
U.S. Pat. No. 4,364,663, Gardner et al

DISCLOSURE OF THE INVENTION

The invention is a scratch depth measuring instrument for use on opaque matte or specular surfaces. It has a light source, a body having an knife edge, the light source being positioned to project a shadow pattern of the knife edge and to image it on a scratched surface transversely to a scratch for measuring its depth and to project a visible indentation with respect to or from the knife edge into the scratch, and which indentation can be measured in distance from the knife edge image to determine the depth of the scratch The image is projected to the surface from a first mirror and there is a mirror system for reflecting the image and measurable indentation for viewing through a microscope. The microscope has a reticle above the knife edge image for viewing through the microscope for measuring the indentation from the knife edge image to determine the depth of the scratch.

The indentation into the scratch is in the form of light indenting into the knife edge shadow image, or in the alternative, the indentation into the scratch is in the form of a shadow extending from the knife edge image into a lighted area of the scratch. There are means for reversing the knife edge with respect to the scratch and the light from a position where the indentation into the scratch is in the form of light indenting into the knife edge shadow image to a position where the indentation into the scratch is in the form of a shadow extending from the knife edge image into a lighted area of the scratch. The indentation is narrowed at one end in accordance with the bottom of the scratch and the other end is widened to the width of the top of the scratch.

The lines on the reticle extend transversely with respect to the scratch and are spaced to measure the indentation and scratch depth when viewed through the microscope above the indentation.

There are means to turn the light source on and off (flicker), each for predetermined set times to enhance perception of the detail of the knife edge shadow image, the scratch and the indentation.

The instrument has a micrometer for adjusting the knife edge to be coincident with a predetermined line or zero measurement line in the reticle, the adjustment being made by moving the first mirror laterally with respect to the knife edge image and the reticle. The scratch depth can be measured with the micrometer by rotating the knob to move the knife edge image so as to move the distal end of the indentation to the predetermined line. This distance of movement, equal to the scratch depth, can be read directly on the micrometer.

The microscope has an eyepiece to bring the reticle into focus. The knife edge is brought into focus by moving a lens relative to and between the knife edge and the first mirror with a knife edge focusing knob. The scratch is brought into focus by moving a lens relative to and between the microscopic eyepiece and the mirror system.

The invention includes the method of moving the instrument to locate a scratch through the eyepiece in a surface externally of the instrument for measuring the depth of the scratch, projecting a shadow pattern of an knife edge to image it transversely across the scratch on the surface, the knife edge being between a light source and a surface containing the scratch. The method further includes projecting a visible indentation with respect to or from the knife edge image into the scratch so as to be able to measure the indentation in distance from the knife edge image within the scratch. The projected knife edge image is then adjusted to make it coincident with a predetermined zero line in the reticle, the reticle having equally spaced measuring lines parallel to the zero line. The length of the indentation is then determined from the zero line on the reticle and the coincident knife edge image along the measuring lines on the reticle through the eyepiece, the length of space between the measuring lines being fixed to indicate the depth of the scratch with respect to the length of the indentation.

The instrument is portable and can be moved anywhere including any accessible surface of an aircraft. The viewing angle of the microscope can be placed at almost any angle and still receive ample illumination. However, the viewing angle is usually set at approximately 90° to the surface plane of the specimen. It is a significant advantage that the instrument can be used at any rotational angle whose axis s approximately normal to the working plane of the instrument. That is, the only movement required is to position the instrument so that the operator can see the specific scratch through the eyepiece of the instrument.

An instrument, according to the invention, used to measure scratches on specular surfaces requires more attention to the incident angle of projection and especially the viewing angle. An appropriate projection angle for the invention is 20°. However, according to the design of the instrument, the incident angle has been varied between 15° and 30°. Other angles could be used with various types of optical systems but these angles appear to provide the best for a small sized, lightweight instrument. It was found that the viewing or reflection angle could be from 40° to 60° but this range did not provide for the desired compactness and the range was limited from 50° to 60° for a particular design.

The invention is unique in that it has the capability to work equally well on opaque matte or specular surfaces. It also has two additional features that aid in recognizing scratches in various circumstances where ambient light may cause interference. One feature, as indicated above, is a reversed shadow projection system. In this mode the shadow is indented into the lighted area of the scratch and has the appearance of extending from the knife edge image. If the knife edge is reversed in the instrument, that is rotated 180°, the light is seen as indenting into the shadow and into the scratch.

The second feature is the use of a flickering light which can be done automatically or by hand whereby the perception of the detail of the knife edge projected shadow is substantially enhanced. The flicker causes the eye of the operator to discern the projected detail of the knife edge and the subsequent pattern on the scratch surface. The flicker mode is obtained by moving a control switch on a control box to the flicker position.

Where high ambient light levels may washout projected shadows, as may occur on aircraft windows, the surface may be painted with a felt pen to make it semi-matte. An alternative is that the surface may be lightly sanded with fine sandpaper so that the scratch depth can be read.

The instrument has the great advantage of permitting removal of scratches without removing the scratched part from the airplane. This saves a very substantial amount of manufacturing and repair costs. For example, to remove a side windshield from an airplane, then remove a scratch thereon, and replace the same windshield costs in the range of between $20,000 and $40,000. The great cost is in the removal and the replacement whereas the cost of removing the scratch is relatively low. Thus, the present invention has great economical value.

Further advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes.

BEST MODE FOR CARRYING OUT THE INVENTION

Figure 1:
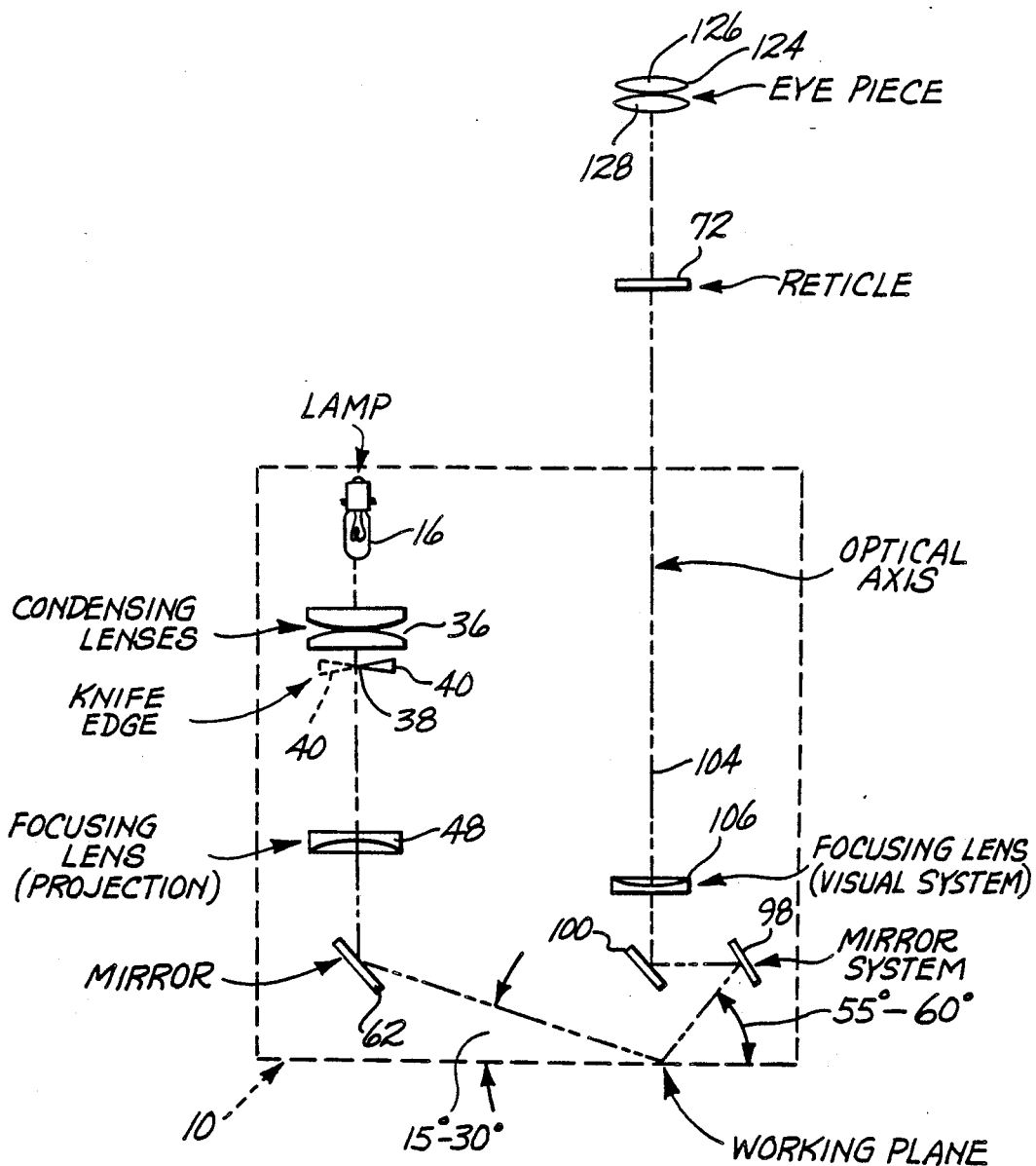
FIG. 1 is a schematic view of the invention.
Figure 2:
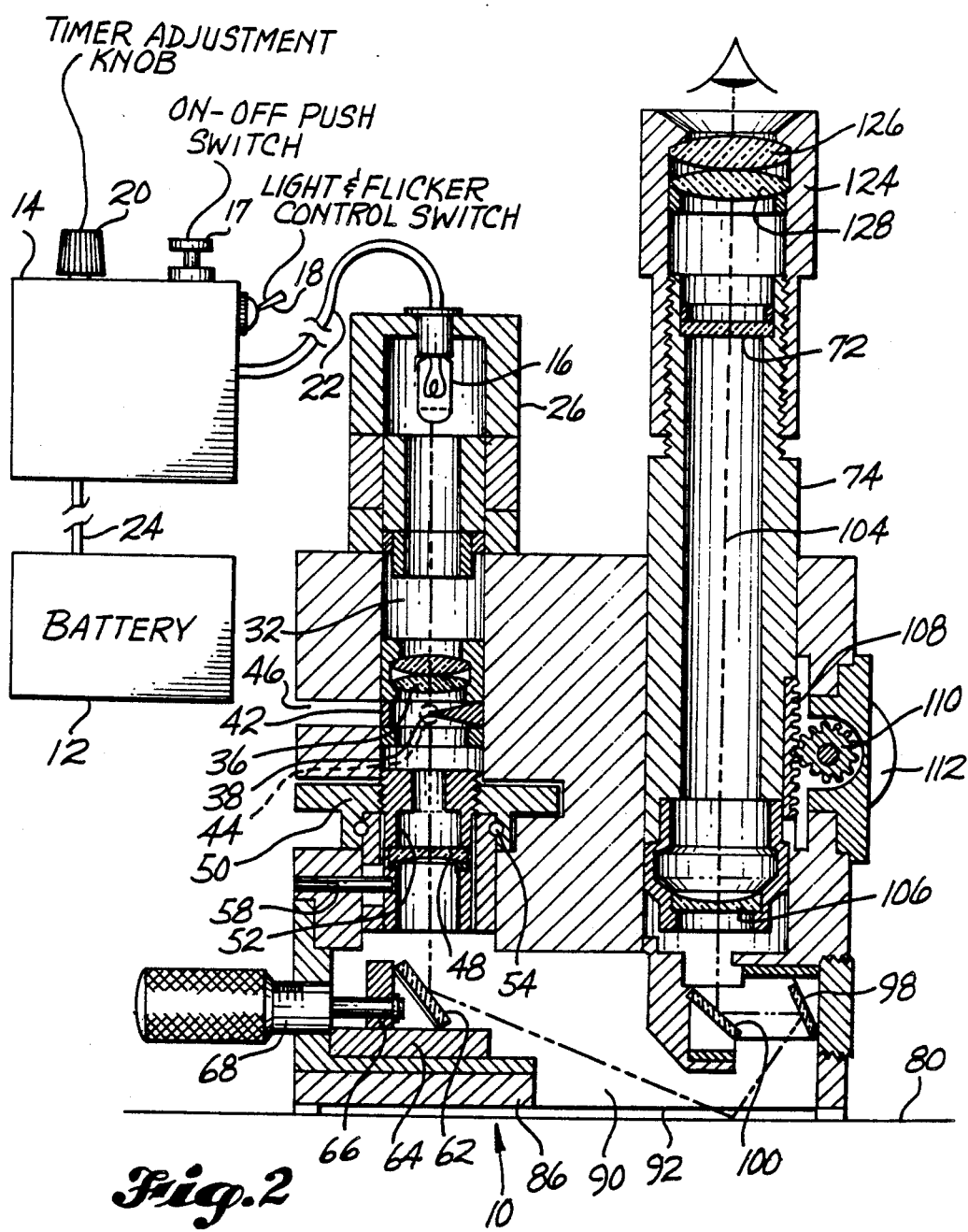
FIG. 2 is a cross sectional elevational view of an instrument incorporating the invention.
Figure 3:
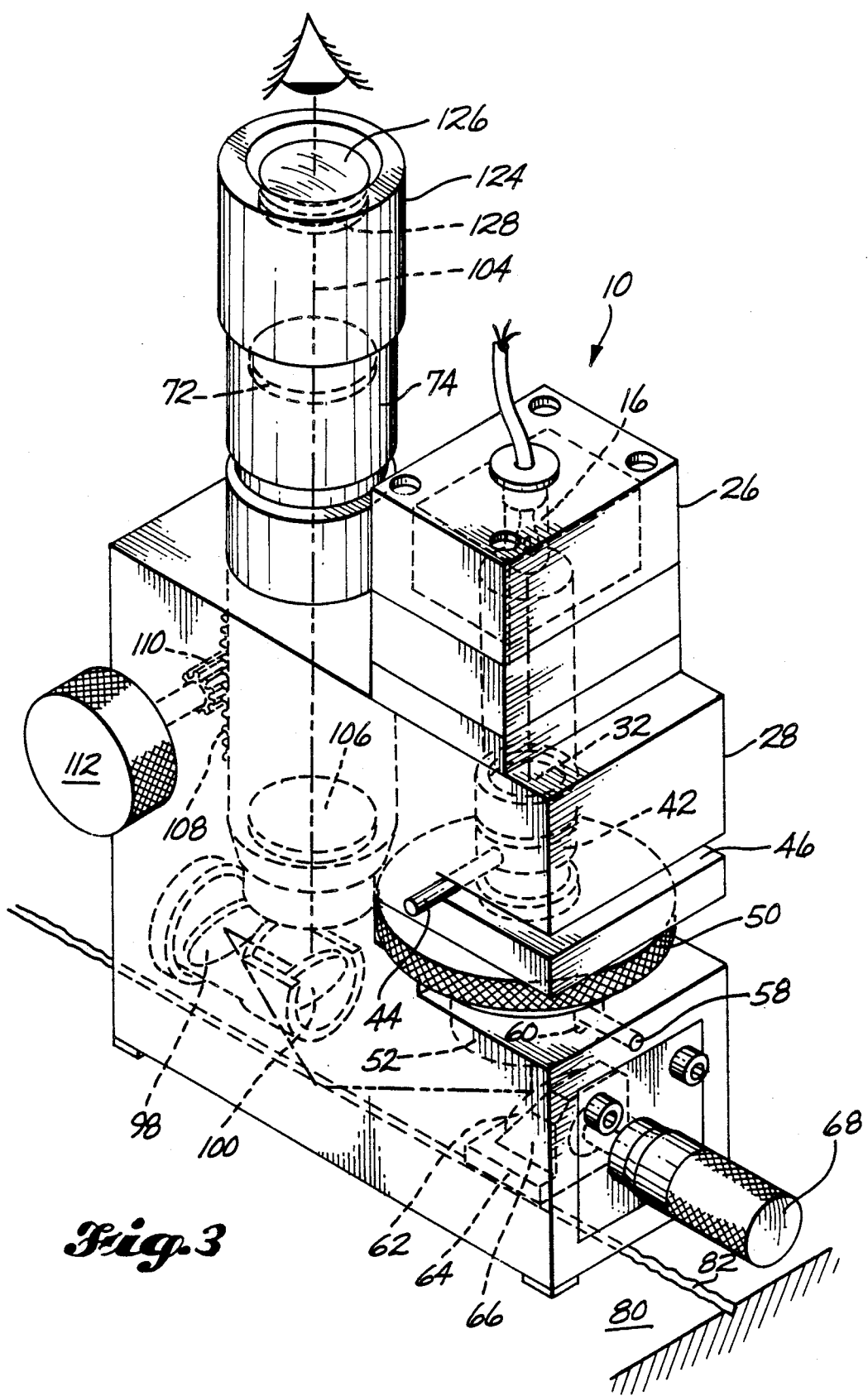
FIG. 3 is a pictorial view of the instrument, illustrating the interior thereof.

Referring again to the drawings, in FIG. 1 there is shown a schematic diagram of an instrument, generally designated as 10, to measure scratch depths and in FIGS. 2 and 3, the instrument is shown in elevation and in its structural form, respectively. The instrument is portable, adapted to be carried by hand and is electrically connected to a battery 12, FIG. 2, and an electrical control box 14 adapted to be worn on a belt of the operator.

The control box 14 has an off and on switch 17 which is operable by hand and which could be used to make an instrument light source 16 flicker as desired. The light 16 is a ten watt halogen cycle bulb. The control box 14 has a circuit therein which causes the light to flicker automatically when control switch 18 is in the flicker position, as shown. When the light is set to flicker to enhance detail perception, the light is on for two seconds and off for one second. When the switch 18 is lowered, the light is on continuously. A time adjustment knob 20 is rotatable to adjust the desired light "on" period, the "on" period is adjusted from 15 to 60 seconds to save battery power. The light 1$ is connected by wires 22 and 24 to the control box 14 and the battery 12, respectively. Light 16 is supported within a rectangular housing 26 which is secured to the top of a generally rectangular main housing 28.

The instrument is compact and by way of example, the height of the main housing is three and one-half inches, its width is three and three quarter inches, and its depth is one and a half inches.

Figure 2A:
FIG. 2A is a plan view of a knife edge.

The light 16 is positioned to illuminate a tubular path 32, FIG. 2, in which there are a pair of fixed condensing lenses 36 directly above a knife edge 38 having a semicircular body 40, FIG. 2A, fitted for rotation in a ring 42 and adapted to be rotated 180° by a reversing rod 44 in groove 46, FIGS. 2 and 3. The reverse position is shown in broken lines in FIG. 1.

In the light path, below the knife edge, is an achromatic knife edge focusing lens 48, adapted to be moved upwardly and downwardly by a cylindrical knife edge focusing knob or disk 50. The lens 48 is held in a vertically movable sleeve 52, threadedly engaged with the knob 50. The knob is bearing mounted at 54. The sleeve 52 is limited in vertical movement by a horizontal pin 58 extending into a vertical slot 60 in the sleeve, FIGS. 2 and 3.

The light 16 projects a shadow of the knife edge and its body 40 on a first mirror 62, fixed on a laterally movable support frame 64, 66. The support frame 64, 66 is movable by a micrometer 68. The micrometer permits precise measurable movement of the mirror 62 as it is used to adjust the projected shadow image of the knife edge 38 to be coincident with a vertical diameter, or zero centerline 70, FIG. 5, of a circular reticle 72 fixed in a microscope 74, to be described.

As shown in FIGS. 2 and 3, the instrument 10 is adapted to be positioned on a scratched surface 80, the scratch being indicated as 82. The bottom 86 of the instrument has an opening 90 through which the light path projects a shadow of the knife edge 38, imaged at 92, FIGS. 4 and 5, transversely with respect to the scratch 82.

For the compact instrument shown, the projected knife edge shadow has an angle of incidence of between 15° and 30° and an angle of reflection between 50° and 60° out of the scratch to a mirror system comprised of second and third mirrors 98 and 100. Mirrors 98 and 100 are fixed as shown in FIGS. 1–3 and reflect the projected shadow image into an optical axis 104 of the microscope 74.

Directly above the third mirror is an achromatic focusing lens 106, adapted to be focused on the scratch by vertical movement by means of a rack 108 and a pinion 110, rotatable by a microscope focusing of 112. In FIG. 2 the lens 106 and the rack are shown to be in their uppermost positions and are adapted to be moved downwardly to focus the microscope on the scratch 82.

Figure 5:
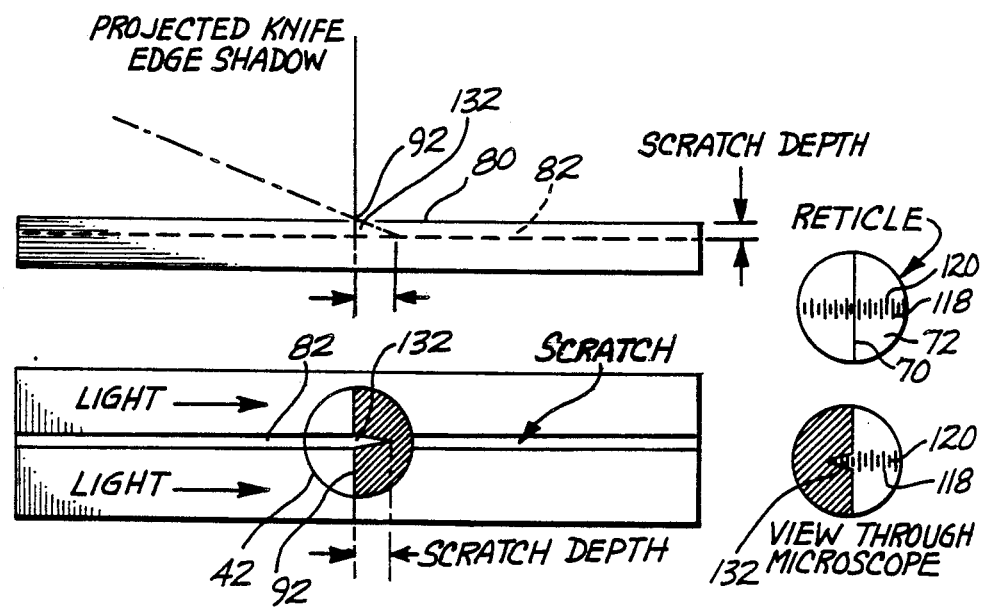
FIG. 5 is a view of the projected shadow into a scratch, illustrating the depth of the scratch in relation to the indentation and the measurement of the dept of the scratch on a microscope reticle.

The reticle 72 is transparent and has its zero centerline 70 positioned on the optical axis 104 and is also marked with a series of incremental, spaced shorter lines 118, 120, FIG. 5, the lines 118 and 120 being spaced apart 0.002", for example, and to be read along the scratch 82. A microscope eyepiece 124 has two lenses 126 and 128, the eyepiece being adapted to be rotated to define the reticle.

In operation, the off/on switch 17 on top of the control box 14 is pushed in to turn on the lamp 16. The toggle switch 18 may then be moved to its upper flicker position or lower continuous-light position. The timing knob may be rotated so that it will adjust the circuit in the box 14 so that the light will remain on for between 15 and 60 seconds as required. When an operator becomes used to the instrument, he finds that most measurements can be made in less than 5 seconds.

For adjusting the instrument, the light is fixed to remain on for 60 seconds. First, the eyepiece is focused by rotating it clockwise or counterclockwise until the reticle 72 becomes well defined. The scratch 82 is then located on the surface without the instrument and when so located, the eyepiece is positioned directly above the scratch. The micrometer 68 is then adjusted until the straight knife edge 38 has its shadow projected to become coincident with the diameter line 70 on the reticle. The knife edge focusing knob 50 is rotated until the projected shadow image 92 is in clear focus. The scratch is focused by rotation of the microscope knob 112.

Figure 4:
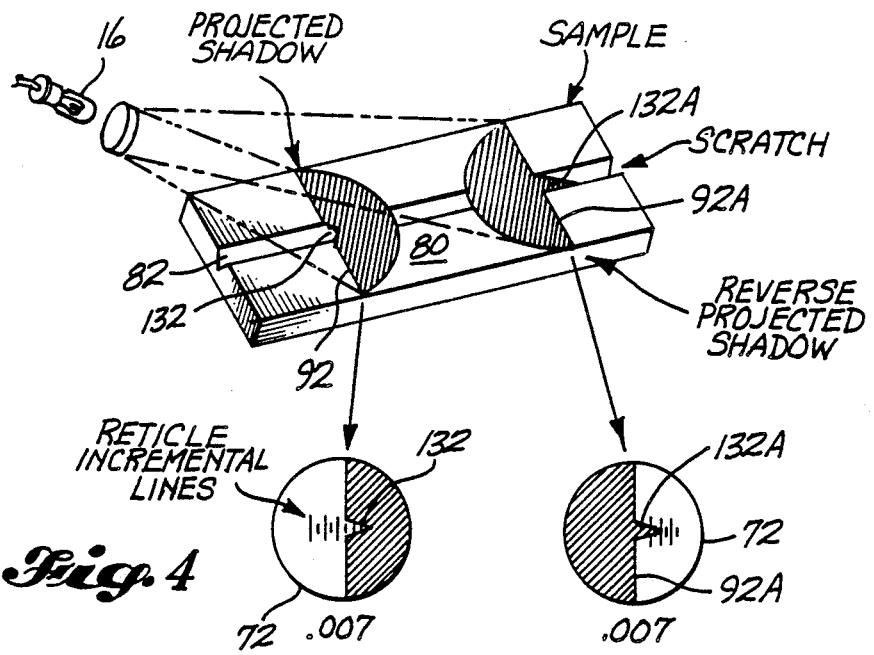
FIG. 4 is a view illustrating two modes of operation of the invention, one in which the projected shadow has an indentation into the scratch in the form of light indenting into the knife edge shadow image and the other is in the form of an indentation into the scratch of a shadow extending from the knife edge image into a lighted area of the scratch, formed by a reverse projected shadow.

The depth of the scratch can be read directly from the incremental lines 118, 120 on the reticle or with the micrometer. With the knife edge in the position shown in FIGS. 1 and 2, the projected shadow of the knife edge and its body is imaged, as seen in FIGS. 4 and 5 on the left with the light indenting into the shadow and extending into the scratch at 132. If the reticle could be read without lenses, the incremental lines and depths would be shown as in the lower left of FIG. 4. Through the microscope it is shown as on the lower right in FIG. 5 where the distance horizontally on the reticle can be read directly to indicate the depth of the scratch, as shown in the upper profile of FIG. 5.

If because of ambient light causing interference, the rod 44 can be rotated 180° to reverse the knife edge to the position shown in broken lines in FIG. 1. This provides a considerable advantage where there is an ambient light problem. When the knife edge is so reversed, the shadow on the surface 80 is that as shown in FIG. 4 on the right and the knife edge shadow is imaged at 92A and the shadow is indented into the scratch as image 132A. If it could be read directly without lenses, it would be as shown in the lower right part of FIG. 4. As indicated, the extent of the indentation depends upon the depth of the scratch and the indentation is actually a profile of the scratch. Both indentations 132, 132A have the general shape of an arrow, being wide at the top of the scratch and pointed at the bottom of the scratch.

The invention device measures scratch depths with an accuracy of plus or minus 0.0005" and measures a scratch depth of 0.001" and upwardly to 0.015". After the first depth is measured the instrument is moved along the scratch to measure its greatest depth. The typical scratches that are required to be removed in an aircraft body surface, window, or windshields, are in the range of 0.007" to 0.0010". Scratches that are greater in depth than the upper end of the range generally are too deep for removal because of resulting weakening of the material.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. Hand-holdable portable apparatus for measuring the depth of a scratch in a surface, said apparatus being for use on matte, opaque, transparent, and specular surfaces, comprising:
   a light projector positioned to project a light beam along a path towards said surface;
   a masking member in said path to mask a portion of said light beam to produce a sharp boundary line between projected light and a shadow;
   a microscope spaced laterally from said light projector, said microscope including an image receiving first end directed towards said surface and an opposite end including an eyepiece;
   a system of mirrors positioned to receive the projected boundary line and redirect it so that it strikes said surface at an angle of incidence in the range of 15° to 30° and to direct the boundary line across the scratch so that the boundary line will have a deflection caused by the scratch, and to receive said boundary line after it has been reflected from said surface at an angle of reflection in the range of 40° to 60° and redirect it into said microscope; to enable reading of scratch depth on matte, opaque, transparent, and specular surfaces without changing either the angle of incidence or the angle of reflection;
   a mounting frame for said light projector, said microscope, and said system of mirrors which is movable along said surface lengthwise along the length of the scratch for depth measurement thereof without significant change in adjustment in the apparatus; and
   means within said microscope for measuring a length of said deflection of the boundary line into the scratch.

2. Apparatus according to claim 1, wherein said masking member includes an opaque portion having a diametrically extending edge which forms the boundary line; and said masking member is rotatable in said path between positions in which said opaque portion masks diametrically opposite portions of said light beam, for the purpose of reversing the projected light and the shadow in position.

3. The apparatus according to claim 1, wherein the microscope and the light projector have nonconverging axes that are substantially parallel to each other and perpendicular to said surface.

4. Hand-holdable portable apparatus for measuring the depth of a scratch in a surface, said apparatus being for use on matte, opaque, transparent, and specular surfaces, comprising:
   a light projector positioned to project a light beam along a path towards said surface;
   a masking member in said path to mask a portion of said light beam to produce a sharp boundary line between projected light and a shadow;
   a microscope spaced laterally from said light projector, said microscope including an image receiving first end directed towards said surface and an opposite end including an eyepiece;
   a system of mirrors positioned to receive the projected boundary line and redirect it so that it strikes said surface at an angle of incidence in the range of 15° to 30° and to direct the boundary line across the scratch so that the boundary line will have a deflection caused by the scratch, and to receive said boundary line after it has been reflected from said surface at an angle of reflection in the range of 40° to 60° and redirect it into said microscope; to enable reading of scratch depth on matte, opaque, transparent, and specular surfaces without changing either the angle of incidence or the angle of reflection;
   a mounting frame for said light projector, said microscope, and said system of mirrors which is movable along said surface lengthwise along the length of the scratch for depth measurement thereof without significant change in adjustment in the apparatus; and
   means within said microscope for measuring a length of said deflection of the boundary line into the scratch;
   in which said masking member includes an opaque portion having a diametrically extending edge which forms the boundary line; and said masking member is rotatable in said path between positions in which said opaque portion masks diametrically opposite portions of said light beam, for the purpose of reversing the projected light and the shadow in position; and
   which comprises a handle projecting radially outwardly from said masking member; and in which said mounting frame includes a slot through which said handle projects to be graspable by an operator and movable along said slot to rotate said masking member in said path.

5. Hand-holdable portable apparatus for measuring the depth of a scratch in a surface, said apparatus being for use on matte, opaque, transparent, and specular surfaces, comprising:
   a light projector positioned to project a light beam along a path towards said surface;
   a masking member in said path to mask a portion of said light beam to produce a sharp boundary line between projected light and a shadow;
   a microscope spaced laterally from said light projector, said microscope including an image receiving first end directed towards said surface and an opposite end including an eyepiece;

a system of mirrors positioned to receive the projected boundary line and redirect it so that it strikes said surface at an angle of incidence in the range of 15° to 30° and to direct the boundary line across the scratch so that the boundary line will have a deflection caused by the scratch, and to receive said boundary line after it has been reflected from said surface at an angle of reflection in the range of 40° to 60° and redirect it into said microscope; to enable reading of scratch depth on matte, opaque, transparent, and specular surfaces without changing either the angle of incidence or the angle of reflection;

a mounting frame for said light projector, said microscope, and said system of mirrors which is movable along said surface lengthwise along the length of the scratch for depth measurement thereof without significant change in adjustment in the apparatus; and means within said microscope for measuring a length of said deflection of the boundary line into the scratch;

wherein said light projector includes a light source; and said apparatus further comprises an on-off switch to turn power to the light source on and off, and a timer controlled switch to cause the power to the light source to be interrupted intermittently causing the light to flicker to enhance details of the boundary line between the projected light and the projected shadow.

6. A method of measuring the depth of scratches in opaque, matte, transparent, and specular surfaces with a hand held apparatus capable of being moved along the length of a scratch for depth measurement thereof, comprising:

projecting a light beam from a light source toward the surface;

masking a portion of said light beam to produce a sharp boundary line between the projected light and a shadow;

providing a microscope with an image receiving first end directed towards the surface and an opposite end including an eyepiece;

spacing the microscope laterally from said light beam;

positioning a system of mirrors to receive the projected boundary line and redirect it so that it strikes the surface at an angle of incidence in the range of 15° to 30° and to direct the boundary line across the scratch so that the boundary line will have a deflection caused by the scratch, and to receive the boundary line at an angle of reflection in the range of 40° to 60° from the surface and to redirect the reflected boundary line into the microscope; and providing an apparatus mounting frame movable along said surface lengthwise along the scratch, and mounting on said frame said light source, the microscope, and the system of mirrors.

7. A method according to claim 6, wherein the step of masking a portion of said light beam comprises providing a mask member which includes an opaque portion having a diametrically extending edge which forms the boundary line; and the method further comprises rotating said mask member between positions in which said opaque portion masks diametrically opposite portions of said light beam for the purpose of reversing the projected light and the shadow in position.

8. A method according to claim 6, comprising translating a mirror of said system of mirrors to move the boundary line along said surface; and using the translation of said mirror as a measure of the deflection of the boundary line.

9. A method according to claim 6, further comprising aligning the microscope and the light beam along axes that are nonconverging and substantially parallel to each other and perpendicular to the surface.

10. The method according to claim 6, wherein the method further comprises moving the mounting frame along the length of the scratch to determine the point along the length of the scratch at which the maximum depth of the scratch occurs.

11. A method of measuring the depth of scratches in opaque, matte, transparent, and specular surfaces with a hand held apparatus capable of being moved along the length of a scratch for depth measurement thereof, comprising:

projecting a light beam from a light source toward the surface;

masking a portion of said light beam to produce a sharp boundary line between the projected light and a shadow;

providing a microscope with an image receiving first end directed towards the surface and an opposite end including an eyepiece;

spacing the microscope laterally from said light beam;

positioning a system of mirrors to receive the projected boundary line and redirect it so that it strikes the surface at an angle of incidence in the range of 15° to 30° and to direct the boundary line across the scratch so that the boundary line will have a deflection caused by the scratch, and to receive the boundary line at an angle of reflection in the range of 40° to 60° from the surface and to redirect the reflected boundary line into the microscope;

providing an apparatus mounting frame movable along said surface lengthwise along the scratch, and mounting on said frame said light source, the microscope, and the system of mirrors; and flickering the light source to enhance detail of the boundary line between the projected light and the projected shadow.

12. Hand-holdable portable apparatus for directly measuring the depth of a scratch in a surface, said apparatus being for use on matte, opaque, transparent, and specular surfaces, comprising:

light projector means for projecting a light beam towards said surface;

masking means in the light projection means for masking a portion of said light beam to produce a sharp boundary line between projected light and a shadow;

a microscope spaced laterally from said light projector means, said microscope including an image receiving first end directed towards said surface and an opposite end including an eyepiece;

first mirror means positioned to receive the projected boundary line and redirect it so that it strikes the surface at an angle of incidence in the range of 15° to 30° and to direct the boundary line across the scratch so that the boundary line will have a deflection caused by the scratch;

second mirror means positioned to receive said boundary line after it has been reflected from said surface at an angle of reflection in the range of 40° to 60° and redirect it into said microscope;

a mounting frame for said light projector means, said microscope, said first mirror means and said second mirror means which is movable along said surface lengthwise along the length of the scratch for depth measurement thereof without significant change in adjustment in the apparatus; and means within said microscope for directly measuring a length of said deflection of the boundary line into the scratch;

wherein said masking means comprises a mask member including an opaque portion having a diametrically extending edge which forms the boundary line, and means for rotating said mask member in position, for the purpose of reversing the projected light and the shadow in position; and wherein the mounting frame includes journal means mounting said mask member for rotation, said means for rotating the mask member includes a handle means projecting radially outwardly from said mask member, and said mounting frame includes a slot in which said handle means is situated and through which the handle means is moved as the mask member is being rotated in position.

13. Apparatus according to claim 12, wherein said slot is dimensioned to allow 180° rotation of said mask member and said slot includes stop means at each end of the rotational movement positioned to be contacted by the handle means.

14. Hand-holdable portable apparatus for directly measuring the depth of a scratch in a surface, said apparatus being for use on matte, opaque, transparent, and specular surfaces, comprising:

light projector means for projecting a light beam towards said surface;

masking means in the light projector means for masking a portion of said light beam to produce a sharp boundary line between projected light and a shadow;

a microscope spaced laterally from said light projector means, said microscope including an image receiving first end directed towards said surface and an opposite end including an eyepiece;

first mirror means positioned to receive the projected boundary line and redirect it so that it strikes the surface at an angle of incidence in the range of 15° to 30° and to direct the boundary line across the scratch so that the boundary line will have a deflection caused by the scratch;

second mirror means positioned to receive said boundary line after it has been reflected from said surface at an angle of reflection in the range of 40° to 60° and redirect it into said microscope;

a mounting frame for said light projector means, said microscope, said first mirror means and said second mirror means which is movable along said surface lengthwise along the length of the scratch for depth measurement thereof without significant change in adjustment in the apparatus; and means within said microscope for directly measuring a length of said deflection of the boundary line into the scratch;

wherein the light projector means includes a light source; and said apparatus further comprises a portable power source capable of being carried by an operator comprising a battery means, and a power control means connected between the battery means and the light source; and wherein the power control means comprises an on-off switch to turn he power to the light source on and off, and timer controlled switch means to cause the power to the light source to be interrupted intermittently causing the light to flicker to enhance details of the boundary line between the projected light and the projected shadow.

15. A method of directly measuring the depth of scratches in opaque, matte, transparent, and specular surfaces with a hand held apparatus capable of being moved along the length of a scratch for depth measurement thereof, comprising:

projecting a light beam toward the surface with a light projector means including a light source masking a portion of said light beam to produce a sharp boundary line between the projected light and a shadow with a masking means;

providing a microscope with an image receiving first end directed towards said surface and an opposite end including an eyepiece;

spacing the microscope laterally from said light projector means;

positioning a first mirror means to receive the projected boundary line to redirect the projected boundary line so that it strikes the surface at an angle of incidence in the range of 15° to 30°;

directing the boundary line across the scratch so that the boundary line will have a deflection caused by the scratch;

positioning a second mirror means to receive said boundary line at an angle of reflection in the range of 40° to 60° from said surface;

redirecting said reflected boundary line into said microscope;

providing an apparatus mounting frame for said light projector means, said microscope, said first mirror means and said second mirror means which is movable on said surface lengthwise of said scratch;

providing a means within said microscope for directly measuring the amount of said deflection of the boundary line; and flickering the light source to enhance detail of the boundary line between the projected light and the projected shadow.

* * * * *

UNITED STATES PATENT AND TRADEMARK OFFICE
CERTIFICATE OF CORRECTION

PATENT NO. : 4,991,967
DATED : February 12, 1991
INVENTOR(S) : Albert K. Creighton It is certified that error appears in the above-identified patent and that said Letters Patent is hereby corrected as shown below:

Column 3, line 58, "s" should be -- is --.

Column 5, line 1, "dept" should be -- depth --.

Column 5, line 28, "1$" should be -- 16 --.

Claim 12, column 10, line 55, "projection" should be
    -- projector --.

Claim 14, column 12, line 15, "he" should be -- the --.

Claim 15, column 12, line 27, "source" should be -- source; --.

Signed and Sealed this

Fourth Day of August, 1992

Attest:

DOUGLAS B. COMER

*Attesting Officer*    *Acting Commissioner of Patents and Trademarks*